United States Patent
Lee et al.

(10) Patent No.: US 10,616,020 B2
(45) Date of Patent: Apr. 7, 2020

(54) TRANSMITTING AND RECEIVING DEVICE AND METHOD IN WIRELESS COMMUNICATION SYSTEM

(71) Applicant: LG ELECTRONICS INC., Seoul (KR)

(72) Inventors: Wookbong Lee, Seoul (KR); Jinsoo Choi, Seoul (KR); Eunsung Park, Seoul (KR); Kiseon Ryu, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 15/500,018

(22) PCT Filed: Jul. 2, 2015

(86) PCT No.: PCT/KR2015/006834
§ 371 (c)(1),
(2) Date: Jan. 27, 2017

(87) PCT Pub. No.: WO2016/017946
PCT Pub. Date: Feb. 4, 2016

(65) Prior Publication Data
US 2017/0272295 A1    Sep. 21, 2017

Related U.S. Application Data

(60) Provisional application No. 62/030,018, filed on Jul. 28, 2014, provisional application No. 62/034,764, (Continued)

(51) Int. Cl.
*H04L 27/26* (2006.01)
*H04L 5/00* (2006.01)
(Continued)

(52) U.S. Cl.
CPC ............ *H04L 27/2608* (2013.01); *H04L 1/00* (2013.01); *H04L 1/0071* (2013.01); *H04L 5/00* (2013.01);
(Continued)

(58) Field of Classification Search
CPC ............ H04L 27/2608; H04L 27/2627; H04L 27/2675; H04L 27/26; H04L 5/00;
(Continued)

(56) References Cited

U.S. PATENT DOCUMENTS 9,385,911 B2 *  7/2016  Vermani ............... H04L 1/0029
2010/0080112 A1   4/2010  Bertrand et al.
(Continued)

FOREIGN PATENT DOCUMENTS

KR    20090064738    6/2009
KR    20100038465    4/2010
(Continued)

OTHER PUBLICATIONS

Josiam et al. "Methods for efficient signaling and addressing in wireless local area network systems", May 2015, U.S. Appl. No. 62/157,344, pp. 1-13 (Year: 2015).*
(Continued)

*Primary Examiner* — Un C Cho
*Assistant Examiner* — Shah M Rahman
(74) *Attorney, Agent, or Firm* — Lee, Hong, Degerman, Kang & Waimey

(57) ABSTRACT

Disclosed is a method for a station (STA) device transmitting data in a Wireless Local Area Network (WLAN) system. The method for transmitting data, according to one embodiment of the present invention, comprises the steps of: FEC encoding transmission data; interleaving the transmission data; constellation mapping the transmission data; performing IDFT on the transmission data; and upconvert-
(Continued)

ing the transmission data and transmitting a transmission signal, wherein IDFT is performed using different FFT sizes for a first part of the transmission signal and a second part of the transmission signal, and the second part of the transmission signal is allocated to at least one STA in units of at least one resource unit.

17 Claims, 18 Drawing Sheets

Related U.S. Application Data filed on Aug. 7, 2014, provisional application No. 62/034,732, filed on Aug. 7, 2014.

(51) Int. Cl.
*H04L 1/00* (2006.01)
*H04W 72/04* (2009.01)
*H04W 84/12* (2009.01)

(52) U.S. Cl.
CPC .......... *H04L 27/26* (2013.01); *H04L 27/2602* (2013.01); *H04L 27/2628* (2013.01); *H04W 72/04* (2013.01); *H04W 84/12* (2013.01)

(58) Field of Classification Search
CPC .............. H04L 1/0071; H04L 27/2602; H04L 27/2628; H04W 72/04; H04W 84/12
See application file for complete search history.

(56) References Cited

U.S. PATENT DOCUMENTS

| | | | | |
|---|---|---|---|---|
| 2011/0255620 A1* | 10/2011 | Jones, IV | .............. | H04L 5/0046 375/260 |
| 2012/0201315 A1* | 8/2012 | Zhang | .................... | H04L 1/0046 375/260 |
| 2012/0230448 A1* | 9/2012 | Kang | ................. | H03M 13/6527 375/295 |
| 2012/0327871 A1* | 12/2012 | Ghosh | .................... | H04L 5/0023 370/329 |
| 2013/0266086 A1* | 10/2013 | Yang | ........................ | H04L 27/10 375/295 |
| 2013/0286959 A1* | 10/2013 | Lou | ......................... | H04W 72/04 370/329 |
| 2014/0307650 A1* | 10/2014 | Vermani | ............... | H04L 5/0044 370/329 |
| 2015/0063255 A1* | 3/2015 | Tandra | ................. | H04J 11/0023 370/329 |
| 2015/0334708 A1* | 11/2015 | Lee | ........................... | H04L 1/00 370/329 |
| 2015/0349995 A1* | 12/2015 | Zhang | .................... | H04L 5/0048 375/295 |
| 2015/0365947 A1* | 12/2015 | Suh | ........................ | H04L 5/0007 370/208 |
| 2016/0143010 A1* | 5/2016 | Kenney | ................. | H04W 4/008 370/330 |
| 2016/0211961 A1* | 7/2016 | Azizi | ......................... | H04L 5/003 |
| 2016/0277543 A1* | 9/2016 | Vermani | ................ | H04L 1/0029 |
| 2016/0285600 A1* | 9/2016 | Sun | ......................... | H04L 5/0007 |
| 2016/0330300 A1* | 11/2016 | Josiam | .................... | H04L 69/22 |
| 2017/0047971 A1* | 2/2017 | Seok | .................... | H04L 27/2602 |

FOREIGN PATENT DOCUMENTS

| | | |
|---|---|---|
| KR | 101297578 | 8/2013 |
| KR | 20140039051 | 3/2014 |

OTHER PUBLICATIONS

Zhang et al., "High Efficiency OFDM Phy for WLAN 802.11ax", Jul. 22, 2014, U.S. Appl. No. 62/027,425, pp. 1-39 (Year: 2014).*
Kraemer et al., "IEEE Std 802.11ac™-2013 Part 11: Wireless LAN Medium Access Control (MAC) and Physical Layer (PHY) Specifications Amendment 4: Enhancements for Very High Throughput for Operation in Bands below 6 GHz", 2013, LAN/MAN Standards Committee of the IEEE Computer Society. pp. 1-425 (Year: 2013).*
PCT International Application No. PCT/KR2015/006834, Written Opinion of the International Searching Authority dated Oct. 14, 2015, 10 pages.

* cited by examiner

【Figure 1】
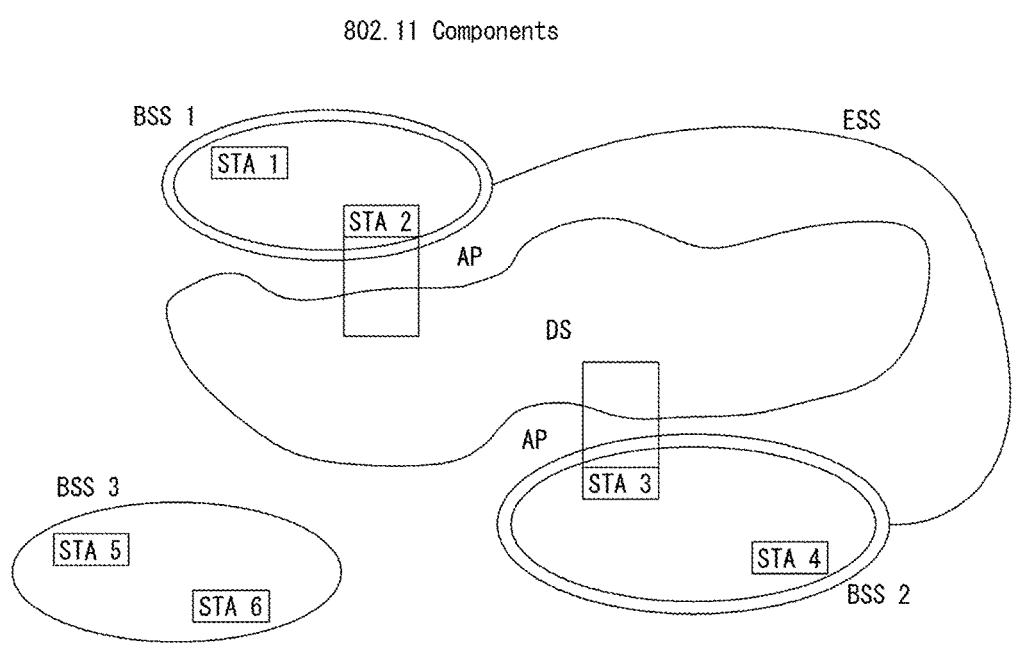

【Figure 2】
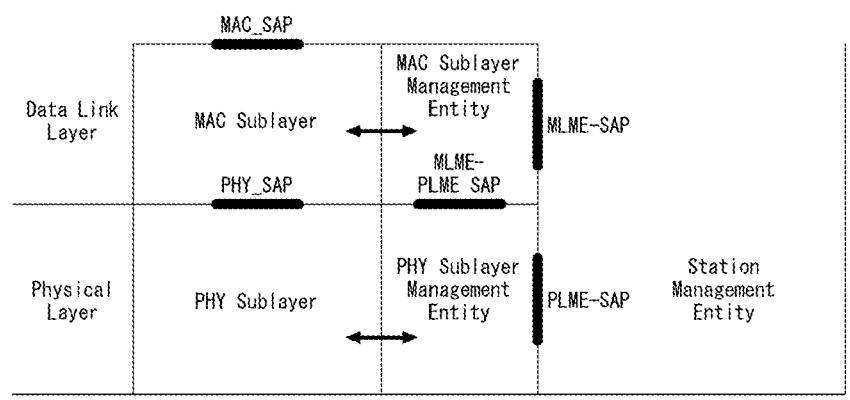

[Figure 3]
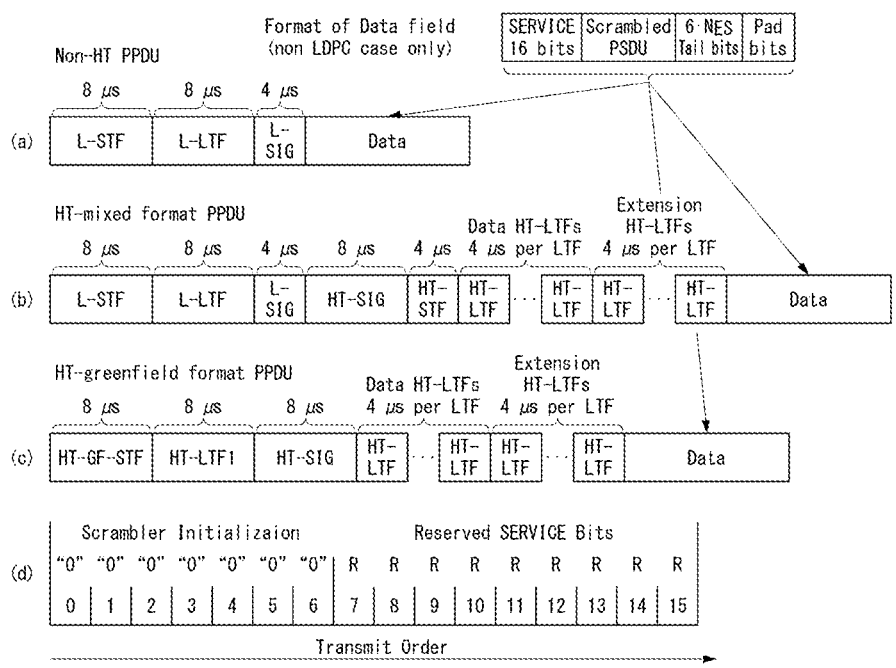

[Figure 4]
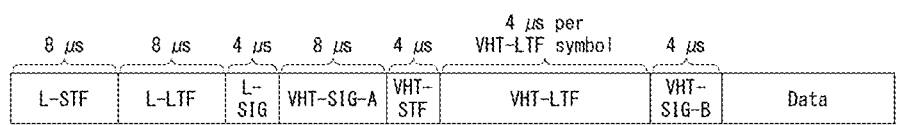

【Figure 5】
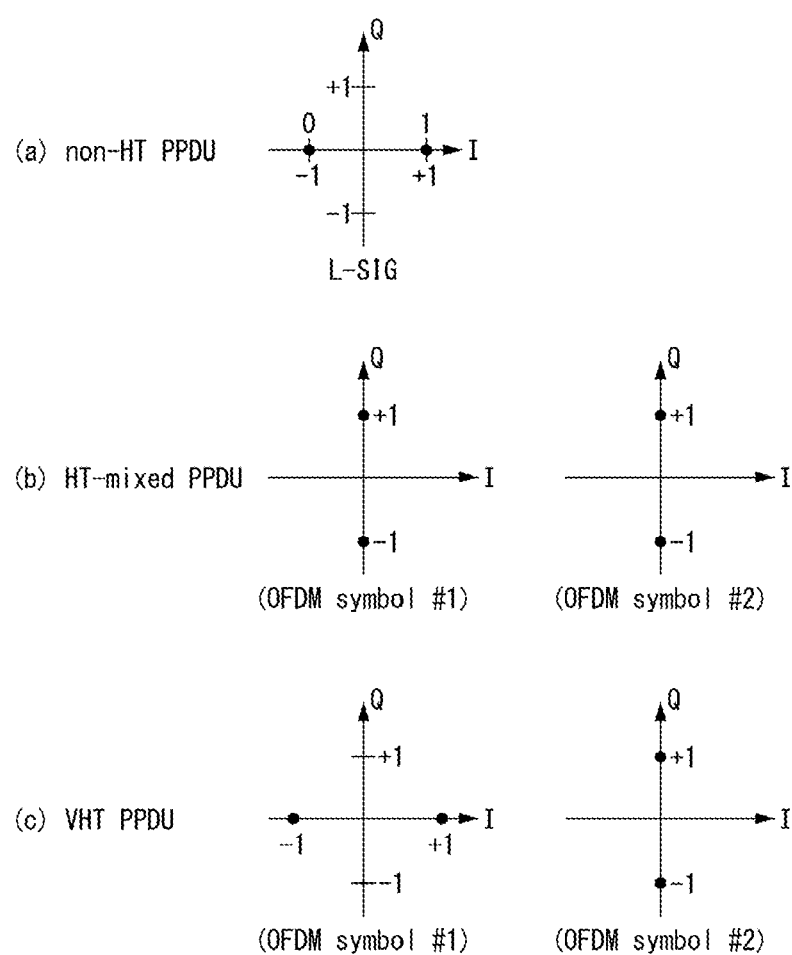

【Figure 6】
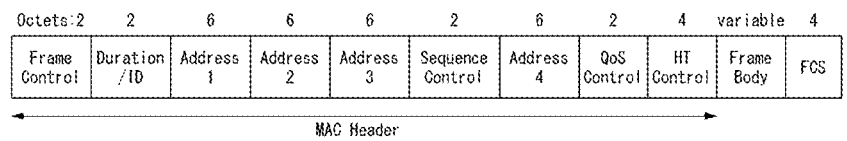

【Figure 7】

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Fragments | Retry | Power Management | More Data | Protected Frame | Order |
| Bits: 2 | 2 | 4 | 1 | 1 | 1 | 1 | 1 | 1 | 1 | 1 |

【Figure 8】
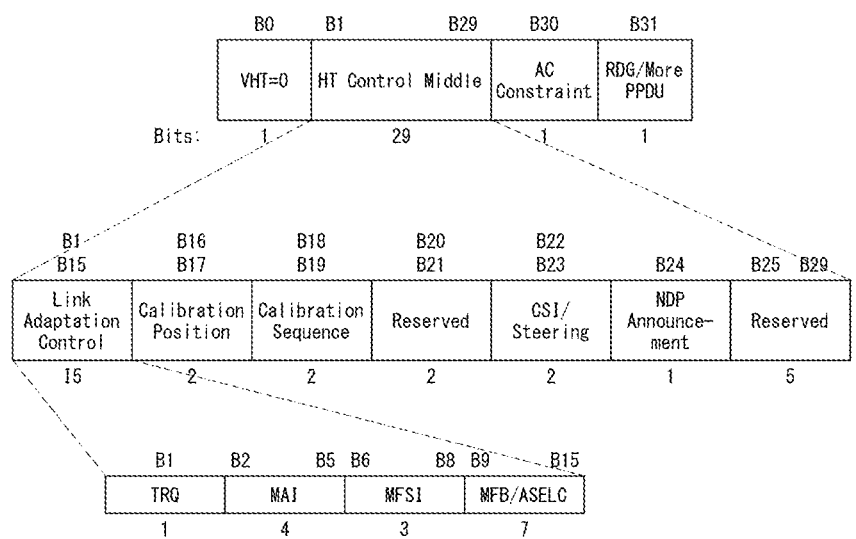

[Figure 9]
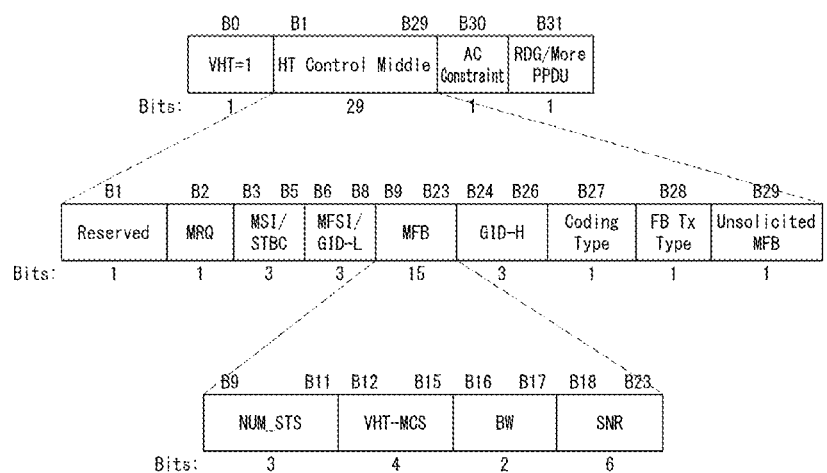

[Figure 10]
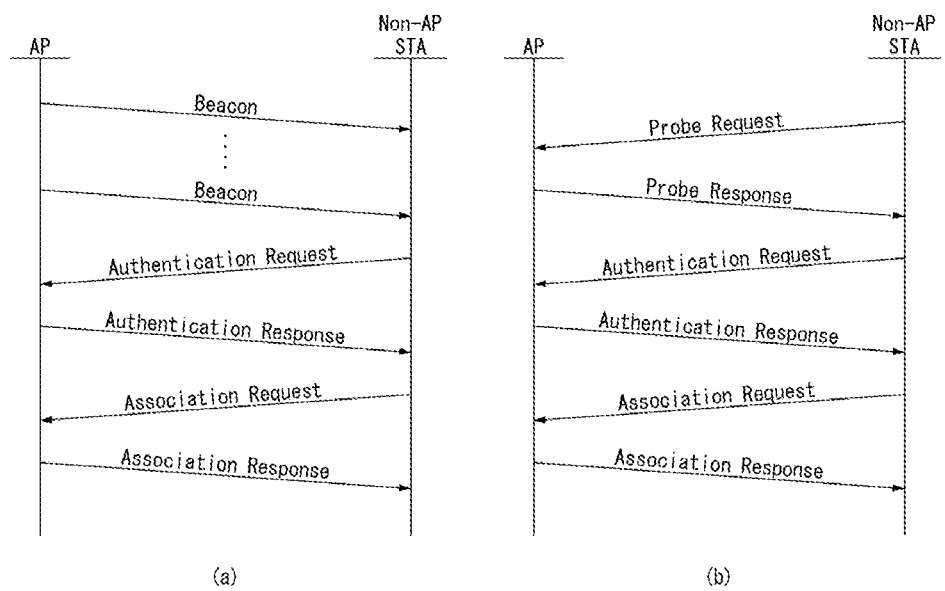

[Figure 11]
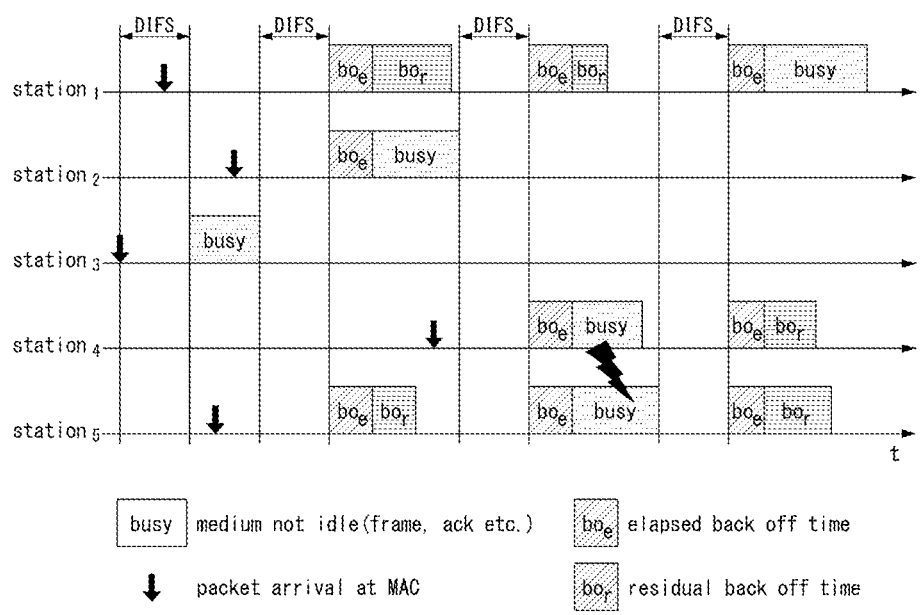

【Figure 12】
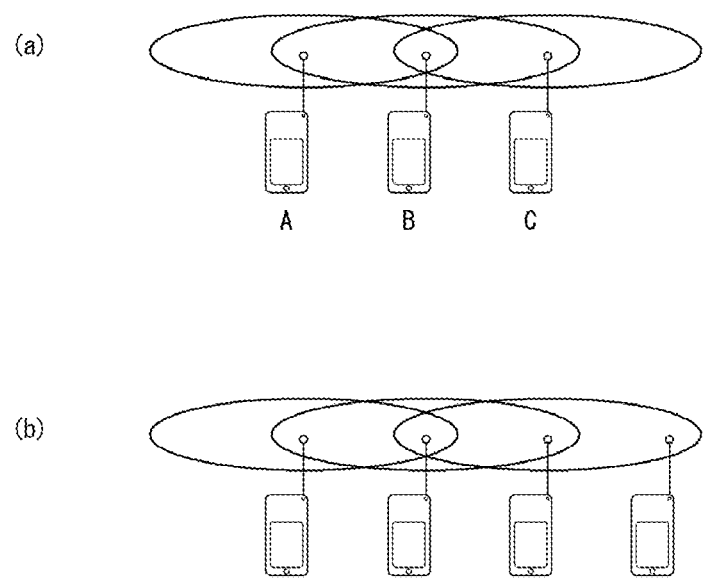

【Figure 13】
(a) 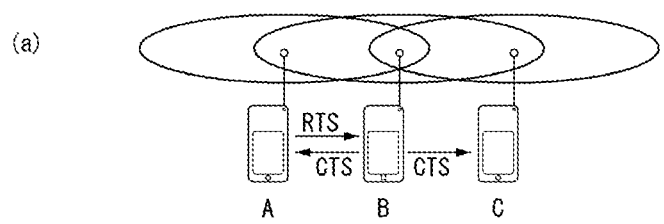
(b) 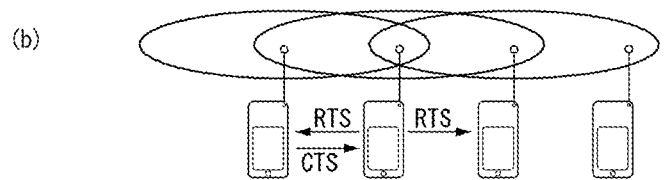

[Figure 14]
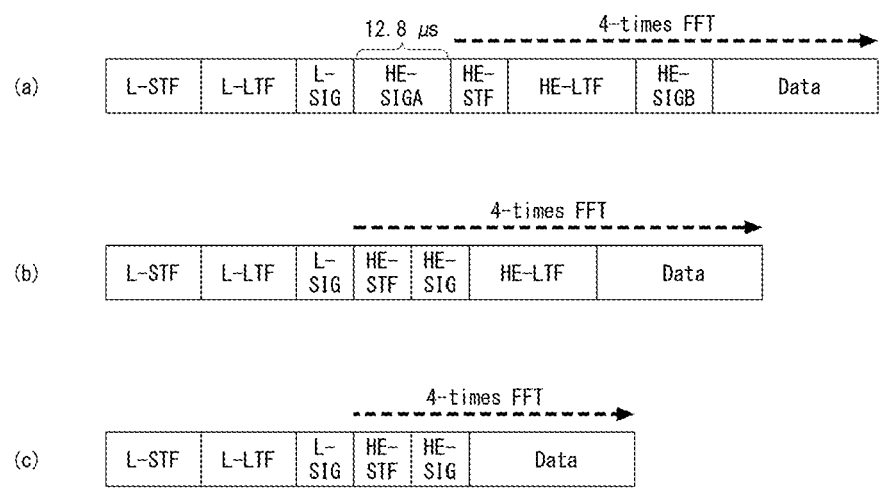

[Figure 15]
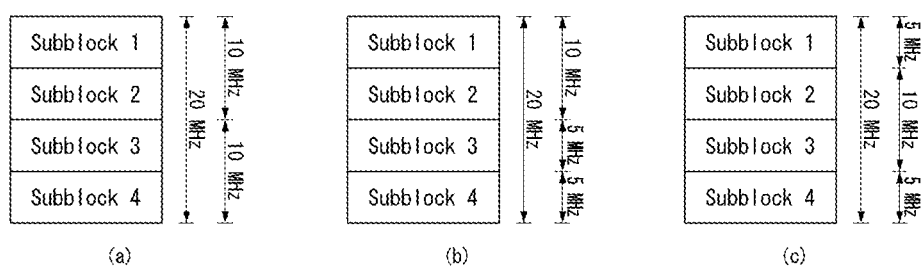
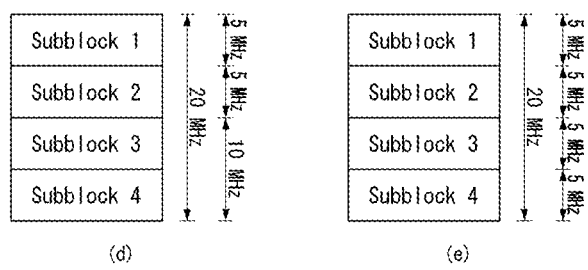

【Figure 16】
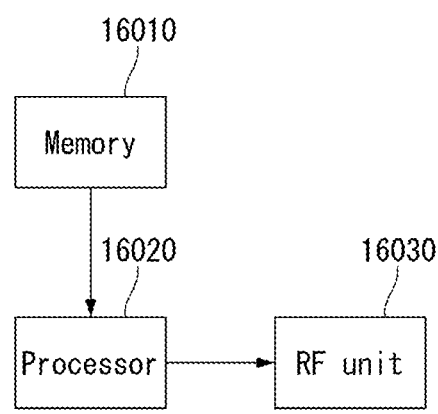

[Figure 17]
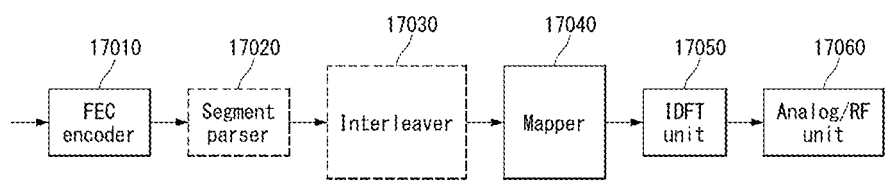

[Figure 18]
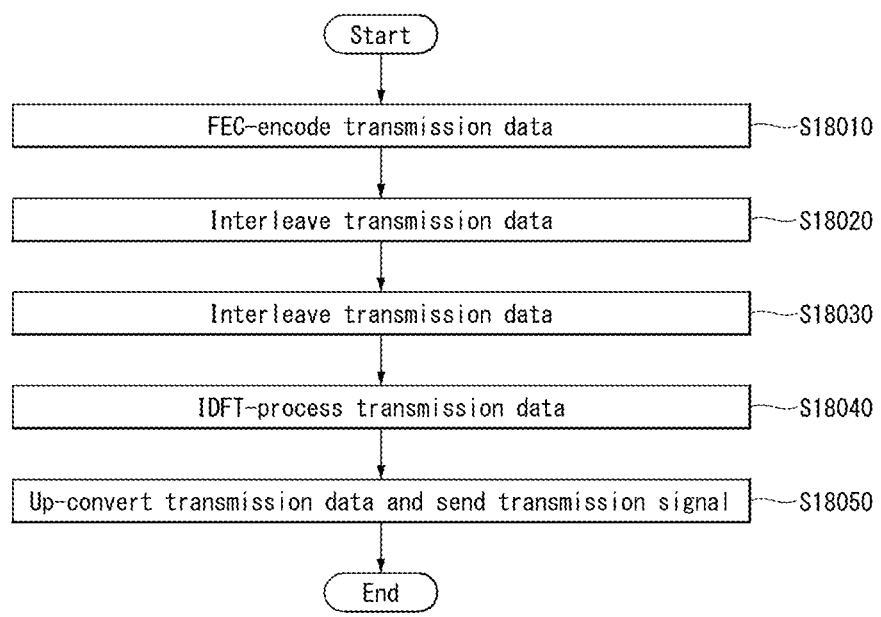

TRANSMITTING AND RECEIVING DEVICE AND METHOD IN WIRELESS COMMUNICATION SYSTEM

CROSS-REFERENCE TO RELATED APPLICATIONS

This application is the National Stage filing under 35 U.S.C. 371 of International Application No. PCT/KR2015/006834, filed on Jul. 2, 2015, which claims the benefit of U.S. Provisional Application No. 62/030,018, filed on Jul. 28, 2014, 62/034,764, filed on Aug. 7, 2014, and 62/034,732, filed on Aug. 7, 2014, the contents of which are all hereby incorporated by reference herein in their entirety.

TECHNICAL FIELD

The present invention relates to a wireless communication system and, more particularly, to a method for allocating a resource block upon signal processing in a wireless communication system and a signal processing method and apparatus for an allocated resource block.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated

DISCLOSURE

Technical Problem

In a next-generation WLAN system, the adoption of a fast Fourier transform (FFT) size greater than that of a legacy WLAN system in a given system bandwidth is taken into consideration in order to improve system throughput or to improve robustness for interference between symbols in an outdoor environment. If the FFT size is increased, various system parameters need to be added depending on the number of increased subcarriers. Accordingly, an embodiment of the present invention proposes a method for improving data processing and system throughput while minimizing a change in the system although OFDMA is performed on data having an increased FFT size. Furthermore, an embodiment of the present invention proposes a method using a plurality of resource units in order to optimize performance and to maintain compatibility with existing WLAN systems when OFDMA is used in an extended FFT size and also proposes a method for allocating and using an interleaver according to such a resource unit.

Technical Solution

Embodiments of the present invention propose an STA device of a WLAN system and a method for transmitting, by the STA device, data.

A method for transmitting, by a station (STA) device, data in a wireless local area network (WLAN) system includes FEC-encoding transmission data, interleaving the transmission data, mapping the transmission data to a constellation, performing IDFT on the transmission data, and up-converting the transmission data and sending a transmission signal. The IDFT is performed on a first part of the transmission signal and a second part of the transmission signal using different FFT sizes. The second part of the transmission signal is allocated to at least one STA in unit of at least one resource unit.

Furthermore, in the method for transmitting, by an STA device, data, the first part of the transmission signal includes a legacy-short training field (L-STF), a legacy-long training field (L-LTF), and a legacy-signaling (L-SIG) field. The second part of the transmission signal includes a data part. Furthermore, in the method for transmitting, by an STA device, data, the IDFT/DFT period of the second part of the transmission signal is four times the IDFT/DFT period of the first part of the transmission signal.

Furthermore, in the method for transmitting, by an STA device, data, the at least one resource unit includes a first resource unit of 26 tones, and the first resource unit of 26 tones is interleaved using an interleaving scheme for a 1 MHz band. Furthermore, in the method for transmitting, by an STA device, data, the at least one resource unit includes a second resource unit of 50 tones, and the second resource unit of 50 tones is interleaved using an interleaving scheme for a 20 MHz band. Furthermore, in the method for transmitting, by an STA device, data, the at least one resource unit includes a third resource unit of 114 tones, and the third resource unit of 114 tones is interleaved using an interleaving scheme for a 40 MHz band.

Furthermore, in the method for transmitting, by an STA device, data, the at least one resource unit includes a fourth resource unit of 242 tones, and the fourth resource unit of 242 tones is interleaved using an interleaving scheme for an 80 MHz band. Furthermore, in the method for transmitting, by an STA device, data, the at least one resource unit includes a fifth resource unit of 484 tones, and the fifth resource unit of 484 tones is interleaved using an interleaving scheme for an 80 MHz band.

Furthermore, in the method for transmitting, by an STA device, data, the symbol interval of the second part of the transmission signal per symbol may be four times the symbol interval of the first part per symbol.

A station (STA) device of a wireless local area network (WLAN) system includes an FEC encoder FEC-encoding transmission data, an interleaver interleaving the transmission data, a mapper mapping the transmission data to a constellation, an IDFT unit performing IDFT on the transmission data, and an analog/RF unit up-converting the transmission data and sending the transmission signal. The IDFT is performed on a first part of the transmission signal and a second part of the transmission signal using different FFT sizes. The second part of the transmission signal is allocated to at least one STA in unit of at least one resource unit.

Furthermore, in the STA device, the first part of the transmission signal includes a legacy-short training field (L-STF), a legacy-long training field (L-LTF), and a legacy-signaling (L-SIG) field. The second part of the transmission signal includes a data part.

Furthermore, in the STA device, the IDFT/DFT period of the second part of the transmission signal is four times the IDFT/DFT period of the first part of the transmission signal.

Furthermore, in the STA device, the interleaver includes a first interleaver for a 1 MHz band, a second interleaver for a 20 MHz band, a third interleaver for a 40 MHz band, and a fourth interleaver for an 80 MHz band.

Furthermore, in the STA device, the at least one resource unit includes a first resource unit of 26 tones, and the first resource unit of 26 tones is interleaved using the first interleaver. Furthermore, in the STA device, the at least one resource unit includes a second resource unit of 50 tones, and the second resource unit of 50 tones is interleaved using the second interleaver.

Advantageous Effects

According to an embodiment of the present invention, system throughput can be improved and robustness for interference between symbols in an outdoor environment can be improved because a specific FFT size is used in a part of a signal and a greater FFT size is used in the other part of the signal.

Furthermore, in an embodiment of the present invention, an interleaver of an existing FFT size can be used as much as possible because data is segment-parsed and interleaved based on an extended FFT size.

Furthermore, in an embodiment of the present invention, resource allocation can be optimized because a plurality of resource units is used to optimize performance and to maintain compatibility with existing WLAN systems when OFDMA is used in an extended FFT size.

Furthermore, system elements to be added can be minimized and system complexity can be reduced because a plurality of resource units is set in a tone unit capable of using the parameters of an existing WLAN system as much as possible.

Other advantageous effects of the present invention are additionally described later in the following embodiments.

DESCRIPTION OF DRAWINGS

FIG. 1 is a diagram showing an example of an IEEE 802.11 system to which an embodiment of the present invention may be applied.

FIG. 2 is a diagram illustrating the configuration of layer architecture of an IEEE 802.11 system to which an embodiment of the present invention may be applied.

FIG. 3 shows a non-HT format PPDU and an HT format PPDU in a wireless communication system to which an embodiment of the present invention may be applied.

FIG. 4 shows a VHT format PPDU in a wireless communication system to which an embodiment of the present invention may be applied.

FIG. 5 is a diagram illustrating a constellation for classifying the format of a PPDU in a wireless communication system to which an embodiment of the present invention may be applied.

FIG. 6 shows the format of an MAC frame in an IEEE 802.11 system to which an embodiment of the present invention may be applied.

FIG. 7 is a diagram illustrating a frame control field within an MAC frame in a wireless communication system to which an embodiment of the present invention may be applied.

FIG. 8 shows the HT format of an HT control field in the MAC frame of FIG. 6.

FIG. 9 shows the VHT format of an HT control field in a wireless communication system to which an embodiment of the present invention may be applied.

FIG. 10 is a diagram illustrating a common uplink setup procedure in a wireless communication system to which an embodiment of the present invention may be applied.

FIG. 11 is a diagram illustrating a random backoff period and a frame transmission procedure in a wireless communication system to which an embodiment of the present invention may be applied.

FIG. 12 is a diagram illustrating a hidden node and an exposed node in a wireless communication system to which an embodiment of the present invention may be applied.

FIG. 13 is a diagram illustrating an RTS and a CTS in a wireless communication system to which an embodiment of the present invention may be applied.

FIG. 14 shows HE PPDU formats according to embodiments of the present invention.

FIG. 15 shows subblock allocation methods according to the application of OFDMA according to embodiments of the present invention.

FIG. 16 shows an STA device according to an embodiment of the present invention.

FIG. 17 shows part of the STA device according to an embodiment of the present invention in more detail.

FIG. 18 is a flowchart illustrating a method for transmitting, by an STA device, data according to an embodiment of the present invention.

BEST MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technical spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 shows that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11a WLAN system to which an embodiment of the present invention may be applied.

FIG. 3 illustrating a non-HT format PPDU and an HT format PPDU in a wireless communication system to which an embodiment of the present invention may be applied.

FIG. 3(a) shows a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field. The L-SIG field may include information about a data rate and a data length.

FIG. 3(b) shows an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) shows an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) shows a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology.

Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 shows a VHT format PPDU in a wireless communication system to which an embodiment of the present invention may be applied.

FIG. 4 shows a VHT format PPDU for supporting an IEEE 802.11ac system.

Referring to FIG. 4, the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field may include information for modulation, encoding and rate-matching of each VHT-STA. The size of the VHT-SIG-B field may different from channel bandwidth used for PPDU transmission or from MIMO transmission types (MU-MIMO or SU-MIMO).

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail with reference to FIG. 5.

FIG. 5 is a diagram illustrating a constellation for classifying the format of a PPDU in a wireless communication system to which an embodiment of the present invention may be applied.

FIG. 5(a) shows the constellation of an L-SIG field included in a non-HT format PPDU, FIG. 5(b) shows phase rotation for HT mixed format PPDU detection, and FIG. 5(c) shows phase rotation for VHT format PPDU detection.

In order to determine a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts to decode a first OFDM symbol and second OFDM symbol corresponding to an HT-SIG field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

The STA attempts to decode the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 shows the format of an MAC frame for an IEEE 802.11 system to which an embodiment of the present invention may be applied.

Referring to FIG. 6, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame. The frame control field is described in more detail later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame.

Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 7 is a diagram illustrating a frame control field within an MAC frame in a wireless communication system to which an embodiment of the present invention may be applied.

Referring to FIG. 7, the frame control field includes a protocol version subfield, a type subfield, a subtype subfield, a To DS subfield, a From DS subfield, a more fragments subfield, a retry subfield, a power management subfield, a more data subfield, a protected frame subfield, and an order subfield.

The protocol version subfield may indicate the version of a WLAN protocol applied to a corresponding MAC frame.

The type subfield and the subtype subfield may be configured to indicate information to identify the function of a corresponding MAC frame.

The type of an MAC frame may include three frame types: a management frame, a control frame, and a data frame.

Furthermore, each of the frame types may be divided into subtypes.

For example, the control frames may include a request to send (RTS) frame, a clear-to-send (CTS) frame, an acknowledgment (ACK) frame, a PS-poll frame, a contention free (CF)-end frame, a CF-end+CF-ACK frame, a block acknowledgment (ACK) request (BAR) frame, a block acknowledgment (ACK) (BA) frame, a control wrapper (control+HT control) frame, a VHT null data packet announcement (NDPA) frame, and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information required to interpret an Address 1 field to an Address 4 field included in the header of a corresponding MAC frame. In the case of a control frame, both the To DS subfield and the From DS subfield are set to "0." In the case of the management frame, the To DS subfield and the From DS subfield may be sequentially set to "1" and "0" if a corresponding frame is a QoS management frame (QMF), and may be sequentially set to "0" and "0" if a corresponding frame is not a QMF.

The More Fragments subfield may indicate whether a fragment to be transmitted after a corresponding MAC frame is present. The More Fragments subfield may be set to "1" if another fragment of a current MSDU or MMPDU is present, and may be set to "0" if another fragment of a current MSDU or MMPDU is not present.

The retry subfield may indicate whether a corresponding MAC frame is based on the retransmission of a previous MAC frame. The retry subfield may be set to "1" if a corresponding MAC frame is based on the retransmission of a previous MAC frame, and may be set to "0" if a corresponding MAC frame is not based on the retransmission of a previous MAC frame.

The power management subfield may indicate power management mode of an STA. If the value of the power management subfield is "1", it may indicate that an STA should switch to power save mode.

The more data subfield may indicate whether an MAC frame to be additionally transmitted is present. The more data subfield may be set to "1" if an MAC frame to be additionally transmitted is present, and may be set to "0" if an MAC frame to be additionally transmitted is not present.

The protected frame subfield may indicate whether a frame body field has been encrypted. The protected frame subfield may be set to "1" if the frame body field includes information processed by a cryptographic encapsulation algorithm, and may be set to "0" if the frame body field does not include information processed by a cryptographic encapsulation algorithm.

The pieces of information included in each of the aforementioned fields may comply with the definition of the IEEE 802.11 system. Furthermore, each of the aforementioned fields corresponds to an example of fields which may be included in an MAC frame, but the present invention is not limited thereto. That is, each of the aforementioned fields may be substituted with another field or may further include an additional field, and all of the fields may not be essentially included.

FIG. 8 shows the HT format of an HT control field in the MAC frame of FIG. 6.

Referring to FIG. 8, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

The HT control middle subfield of an HT control field for HT may include a link adaptation subfield, a calibration position subfield, a calibration sequence subfield, a reserved subfield, a channel state information (CSI)/steering subfield, an HT null data packet (NDP) announcement subfield, and a reserved subfield.

The link adaptation subfield may include a training request (TRQ) subfield, a modulation and coding scheme (MCS) request or antenna selection indication (ASEL) (MAI) subfield, an MCS feedback sequence identifier (MFSI) subfield, and an MCS feedback and antenna selection command/data (MFB/ASELC) subfield.

The TRQ subfield may be set to "1" if the transmission of a sounding PPDU is requested from a responder, and may be set to "0" if the transmission of a sounding PPDU is not requested from a responder.

If the MAI subfield is set to 14, it indicates an ASEL indication, and the MFB/ASELC subfield is interpreted as an antenna selection command/data. If not, the MAI subfield indicates an MCS request, and the MFB/ASELC subfield is interpreted as MCS feedback.

If the MAI subfield indicates an MCS request (MRQ), the MAI subfield is interpreted as including an MCS request (MRQ) and an MRQ sequence identifier (MSI). The MRQ subfield is set to "1" if MCS feedback is requested, and is set to "0" if MCS feedback is not requested. When the MRQ subfield is "1", the MSI subfield includes a sequence number for specifying an MCS feedback request. When the MRQ subfield is "0", the MSI subfield is set as reserved bits.

Each of the aforementioned subfields corresponds to an example of subfields which may be included in the HT control field, and may be substituted with another subfield or may further include an additional subfield.

FIG. 9 shows the VHT format of an HT control field in a wireless communication system to which an embodiment of the present invention may be applied.

Referring to FIG. 9, the HT control field may include a VHT subfield, an HT control middle subfield, an AC constraint subfield, and a reverse direction grant (RDG)/more PPDU subfield.

In FIG. 9, an HT control field for VHT (i.e., VHT=1) is assumed and described. The HT control field for VHT may be denoted as a VHT control field.

A description of the AC constraint subfield and the RDG/More PPDU subfield is the same as that described with reference to FIG. 8 and is omitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field or may further include additional fields, and all of the fields may not be essentially included.

Link Setup Procedure

FIG. 10 is a diagram illustrating a common uplink setup procedure in a wireless communication system to which an embodiment of the present invention may be applied.

In order to set up a link with a network and to transmit/receive data, first, an STA may experience a scanning procedure for discovering the network, an authentication procedure, an association procedure, etc. Such a link setup procedure may also be called a session initiation procedure or a session setup procedure. Furthermore, the scanning, authentication, and association procedures of the link setup procedure may be generally called an association procedure.

In a WLAN, a scanning procedure includes a passive scanning procedure and an active scanning procedure.

FIG. 10(a) shows a link setup procedure according to passive scanning, and FIG. 10(b) shows a link setup procedure according to active scanning.

As shown in FIG. 10(a), the passive scanning procedure is performed through a beacon frame that is periodically broadcasted by an AR The beacon frame is one of management frames in IEEE 802.11, and provides notification of the presence of a wireless network. The beacon frame is periodically (e.g., at an interval of 100 msec) broadcasted so that a non-AP STA performing scanning discovers a wireless network and participates in the wireless network. Information about a current network (e.g., information about a BSS) is carried on the beacon frame.

In order to obtain information about a network, a non-AP STA waits for the reception of a beacon frame while passively moving to channels. The non-AP STA that has received the beacon frame may store information about a network, included in the received beacon frame, may move to a next channel, and may perform scanning in a next channel using the same method. When the non-AP STA receives the beacon frame and obtains the information about the network, a scanning procedure in a corresponding channel is completed.

The passive scanning procedure is advantageous in that overall overhead is small because the passive scanning procedure is completed if a non-AP STA has only to receive a beacon frame without a need to transmit another frame as described above. However, the passive scanning procedure is disadvantageous in that the time taken for a non-AP STA to perform scanning is increased in proportion to the period in which a beacon frame is transmitted.

In contrast, in an active scanning procedure, such as that of FIG. 10(b), in order to discover that what AP is present nearby, a non-AP STA broadcasts a probe request frame while actively moving to channels, and requests network information from all of APs that have received the probe request frame.

A responder that has received a probe request frame waits for a random time in order to prevent a frame collision, carries network information on a probe response frame, and transmits the probe response frame to a corresponding non-AP STA. The non-AP STA that has received the probe response frame may store network-related information included in the received probe response frame, may move to a next channel, and may perform scanning using the same method. When the non-AP STA receives the probe response frame and obtains the network information, a scanning procedure is completed.

The active scanning procedure is advantageous in that scanning can be rapidly completed compared to the passive scanning procedure, but overall network overhead is increased because an additional frame sequence is required.

The non-AP STA that has completed the scanning procedure selects a network based on its own criterion and performs an authentication procedure along with a corresponding AP.

The authentication procedure is performed by a process in which the non-AP STA transmits an authentication request frame to the AP and a process in which the AP transmits an authentication response frame to the non-AP STA in response to the authentication request frame, that is, through 2-way handshaking.

The authentication frame used in the authentication request/response frame corresponds to the management frame.

The authentication frame may include information about an authentication algorithm number, an authentication transaction sequence number, a status code, challenge text, a robust security network (RSN), a finite cyclic group, etc. Such information corresponds to an example of some of pieces of information which may be included in the authentication request/response frame and may be substituted with another piece of information or may further include additional information.

The non-AP STA may transmit an authentication request frame to the AP. The AP may determine whether or not to permit authentication for the non-AP STA based on information included in the received authentication request frame. The AP may provide the results of the processing of the authentication to the non-AP STA through an authentication response frame.

The non-AP STA and the AP perform mutual authentication through the authentication procedure and then establish association.

The association process is performed by a process in which the non-AP STA transmits an association request frame to the AP and a process in which the AP transmits an association response frame to the non-AP STA in response to the association request frame, that is, through 2-way handshaking.

The association request frame may include information related to various capabilities of the non-AP STA and information about a beacon listen interval, a service set identifier (SSID), supported rates, supported channels, an RSN, a mobility domain, supported operating classes, a traffic indication map (TIM) broadcast request, an interworking service capabilities, etc.

The AP determines whether the non-AP STA can be supported based on the information. After the determination, the AP includes information about whether the association request has been accepted or not, a reason for the acceptance or rejection of the association request, and capability information of the AP in an association response frame, and transmits the association response frame to the non-AP STA.

The association response frame may include information related to various capabilities and information, such as status code, an association ID (AID), supported rates, an enhanced distributed channel access (EDCA) parameter set, a received channel power indicator (RCPI), a received signal to noise indicator (RSNI), a mobility domain, a timeout interval (or an association comeback time), an overlap BSS scan parameter, a TIM broadcast response, a quality of service (QoS) map, etc.

The pieces of information which may be included in the aforementioned association request/response frame correspond to examples and may be substituted with other pieces of information or may further include additional information.

When the non-AP STA and the AP successfully establish association, normal transmission/reception is performed. In contrast, if association with the AP is not successfully established, the non-AP STA may attempt the association procedure again or attempt association with another AP based on a corresponding reason.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 11 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 11, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 11 shows that the STA 2 has selected the smallest backoff count value and the STA 1 has selected the greatest backoff count value. That is, FIG. 11 shows that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 11 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

Furthermore, in order to reduce the collision possibility, a robust collision detection mechanism has been introduced. This is described below with reference to FIGS. 12 and 13. An actual carrier sensing range and a transmission range may be the same, but are assumed to be the same, for convenience of description.

FIG. 12 is a diagram illustrating a hidden node and an exposed node in a wireless communication system to which an embodiment of the present invention may be applied.

FIG. 12(a) shows a hidden node and shows an example in which an STA A and an STA B are communicating with each other and an STA C has information to be transmitted. More specifically, the STA A transmits information to the STA B, but when the STA C performs carrier sensing before transmitting data to the STA B, it may determine a medium to be an idle state. The reason for this is that the transmission (i.e., the medium occupied) of the STA A may not be sensed at the location of the STA C. In this case, a collision is generated because the STA B receives information from the STA A and the STA C at the same time. In this case, the STA A may be called a hidden node of the STA C.

FIG. 12(b) shows an exposed node and shows an example in which while an STA B transmits data to an STA A, an STA C has information to be transmitted to an STA D. In this case, if the STA C performs carrier sensing, it may determine that a medium has been occupied due to the transmission of the STA B. Accordingly, the STA C has to wait until the medium becomes an idle state because the medium is sensed as being a busy state although the STA C has information to be transmitted to the STA D. However, since the STA A is out of the transmission range of the STA C, the transmission of the STA C and the transmission of the STA B may not collide against each other form a standpoint of the STA A. As a result, the STA C unnecessarily waits until the STA B stops transmission. In this case, the STA C may be called an exposed node of the STA B.

FIG. 13 is a diagram illustrating an RTS and a CTS in a wireless communication system to which an embodiment of the present invention may be applied.

In exemplary situations, such as those of FIG. 12, in order to efficiently use a collision avoidance mechanism, short signaling packets, such as request to send (RTS) and clear to send (CTS), may be used. RTS/CTS between two STAs enable surrounding STA(s) to perform overhearing. Accordingly, the surrounding STA(s) may take into consideration whether they will transmit information therebetween.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

FIG. 13(a) shows an example of a method for solving a hidden node problem. It is assumed that both an STA A and an STA C try to transmit data to an STA B. When the STA A transmits RTS to the STA B, the STA B transmits CTS to both the STA A and the STA C around the STA A. As a result, the STA C waits until the data transmission of the STA A and the STA B is terminated, thereby being capable of avoiding a collision.

FIG. 13(b) shows an example of a method for solving an exposed node problem. An STA C may determine that a collision will not be generated although it transmits data to another STA (e.g., an STA D) by overhearing RTS/CTS transmission between an STA A and an STA B. That is, the STA B transmits RTS to all of surrounding STAs and transmits CTS to only the STA A having data to be actually transmitted. Since the STA C has received only the RTS, but has not received the CTS of the STA A, it may be aware that the STA A is out of the carrier sensing of the STA C.

HE System

A next-generation WLAN system is described below. The next-generation WLAN system is a next-generation WIFI system. One embodiment of such a next-generation WIFI system may be IEEE 802.11ax, for example. In this specification, the following next-generation WLAN system is named a high efficiency (HE) system. The frame, PPDU, etc. of such a system may be called an HE frame, an HE PPDU, an HE preamble, an HE-SIG field, an HE-STF, an HE-LTF, etc.

A description of an existing WLAN system, such as the aforementioned VHT system, may be applied to contents not additionally described with respect to an HE system. For example, the description of the VHT-SIG A field, VHT-STF, VHT-LTF, and VHT-SIG-B field may be applied to the HE-SIG A field, HE-STF, HE-LTF, and HE-SIG-B field. The HE frame, preamble, etc. of the proposed HE system may be used in other wireless communication or cellular systems. An HE STA may be a non-AP STA or an AP STA as described above. In the following specification, although it is an STA, such an STA device may represent an HE STA device.

The HE-SIG A field may include common control information in common transmitted to STAs which receive a PPDU. The HE-SIG A field may be transmitted in 1 to 3 OFDM symbols. The HE-SIG A field is duplicated in a 20 MHz unit and may include the same information. Furthermore, the HE-SIG-A field provides notification of information about the full bandwidth of a system. In an embodiment, the HE-SIG A field may include at least one of bandwidth information, group ID information, stream information, UL indication information, guard interval indication information, allocation information, and transmission power information.

The HE-SIG B field may include user-specific information that is necessary for each STA to receive its own data (e.g., a PSDU). The HE-SIG B field may be transmitted in one or two OFDM symbols. For example, the HE-SIG B field may include information about the modulation and coding scheme (MCS) of a corresponding PSDU and the length of a corresponding PSDU.

In the HE system, an OFDMA scheme may be used to send/receive more data to/from a plurality of or a number of STAs at the same time. Orthogonal frequency division multiple access (OFDMA) is a multi-user version of an OFDM digital modulation scheme. The OFDMA scheme is a method in which one user does not exclusively posses multiple carriers according to the OFDM scheme, that is, subcarriers, but a plurality of users to each of which a partial set of subcarriers is allocated and uses the subcarriers.

Furthermore, in the HE system, for average throughput enhancement and outdoor robust transmission, an FFT size four times greater than that of an existing WLAN system is to be used. In this case, in order to maintain inverse compatibility with an existing system, the 4×FFT scheme may not be used in all of the parts of a frame, and 4×FFT is to be applied to parts subsequent to a part including a legacy part in a preamble.

If the 4×FFT scheme is to be applied, the symbol period of a symbol to which the 4× FFT scheme has been applied becomes four times. This corresponds to an embodiment in which a constant full bandwidth is used and subcarrier spacing of ¼ times is used if a 4× FFT size is used. The period of one symbol may be four times (4×) because subcarrier spacing is ¼. Furthermore, a 1×FFT size, that is, a basis for the 4×FFT size, may be an FFT size of a VHT system (IEEE 802.11ac). Accordingly, the 1×FFT size, that is, a basis for the 4×FFT size, may correspond to an FFT size of a legacy preamble part (an L-STF, an L-LTF, and an L-SIG) of a frame. The period of one preamble for the 1×FFT may be the sum of an IDFT/DFT period of 3.2 us and the period of a guard interval symbol. A long guard interval period maybe 4 us (3.2+0.8), and a short guard interval period may be 3.6 us (3.2+0.4). Since the symbol period of a data part is 3.2 us, one symbol period may be 12.8 us if the 4×FFT scheme is applied in the HE system. Alternatively, the symbol period of the data part is four times the IDFT/DFT period and may be represented as 12.8 us.

FIG. 14 shows HE PPDU formats according to embodiments of the present invention.

If 4×FFT is used in the HE system, the 4×FFT scheme may be applied to only parts subsequent to the part of a frame. This is for maintaining reverse compatibility with a legacy system. FIG. 14 shows embodiments in which the 4×FFT scheme is used in part of a frame.

The embodiment of FIG. 14(a) shows an example in which a 1×FFT size is used up to the HE-SIG A field of a frame and the 4×FFT scheme is used in subsequent parts. In FIG. 14(a), the HE PPDU format may include the HE-SIG-A field of 12.8 us, and an HE-STF, an HE-LTF, and an HE-SIGB field each having 1 symbol. In the case where 4×FFT is applied, if the transmission bands of HE PPDUs are 20 MHz, 40 MHz, 80 MHz, and 160 MHz, respectively, each of pieces of FFT respectively having a 256 size, a 512 size, a 1024 size, and a 2048 size may be applied to parts subsequent to the HE-STF of the frame. In such a case, the length of the preamble of the HE PPDU is 8(L-STF)+8(L-LTF)+4(L-SIG)+12.8(HE-SIG-A)+16(HE-STF)+16(HE-LTF)+16(HE-SIG-B)=80.8 us.

The embodiment of FIG. 14(b) shows an example in which a 1×FFT size is used up to the legacy preamble (an L-STF, an L-LTF, and an L-SIG) of a frame and the 4×FFT scheme is used in subsequent parts. In FIG. 14(b), in the case where 4×FFT is applied, if the transmission bands of HE PPDUs are 20 MHz, 40 MHz, 80 MHz, and 160 MHz, respectively, each of pieces of FFT respectively having a 256 size, a 512 size, a 1024 size, and a 2048 size may be applied to parts subsequent to the HE-STF of the frame. In such a case, the length of the preamble of the HE PPDU is 8(L-STF)+8(L-LTF)+4(L-SIG)+16(HE-SIG)+16(HE-STF)+16(HE-LTF)=68 us.

The embodiment of FIG. 14(c) shows an example in which a 1×FFT size is used up to the legacy preamble (an L-STF, an L-LTF, and an L-SIG) of a frame and the 4×FFT scheme is used in subsequent parts. In FIG. 14(b), in the case where 4×FFT is applied, if the transmission bands of HE PPDUs are 20 MHz, 40 MHz, 80 MHz, and 160 MHz, respectively, each of pieces of FFT respectively having a 256 size, a 512 size, a 1024 size, and a 2048 size may be applied to parts subsequent to the HE-STF of the frame. In such a case, the length of the preamble of the HE PPDU is 8(L-STF)+8(L-LTF)+4(L-SIG)+16(HE-STF)+16(HE-SIGA)=52 us.

In the case of single stream transmission, an HE-LTF or a reference signal may not be included in a frame and an HE-STF may be precoded using the same precoder used in a data symbol.

If the 4×FFT scheme is used as described above, the numerology of a system is changed. The numerology may indicate a number, that is, a data processing unit in the system. For example, the following numbers may be used as system numerologies.

N_SD: the number of complex data numbers per frequency segment

N_SP: the number of pilot values per frequency segment

N_ST: a total number of subcarriers per frequency segment

N_SR: the highest data subcarrier index per frequency segment

In other words, N_SD may indicate the number of data subcarriers per symbol. In the following description, N_SD is described as being system numerology, for example. Furthermore, the application of a specific numerology means that the specific numerology is applied to a system configuration used for a specific N_SD. For example, this may mean that an interleaver for a specific N_SD is used.

If 4×FFT is used, many system configurations may need to be modified or changed because the number of data subcarriers per symbol N_SD is changed. For example, an interleaver that is four times (4×) greater than an existing case where a 20-MHz band signal is interleaved may be necessary. In order to minimize the modification/change of such a system configuration, an embodiment of the present invention proposes a method for minimizing the addition of a new system element using existing system elements while using 4×FFT.

An HE system according to an embodiment of the present invention may include basic system blocks for processing an existing WLAN frame because it supports compatibility with an existing WLAN system. For example, an HE STA may include the interleaver blocks of an existing system in order to process a frame of a legacy system. In an embodiment, an HE STA according to an embodiment of the present invention may include the interleavers of an existing 802.11 system. In such interleavers, for example, a 1 MHz interleaver may correspond to the interleaver of an IEEE 802.11ah system, and a 20 MHz interleaver, a 40 MHz interleaver, and an 80 MHz interleaver may correspond to the interleavers of an 802.11ac system. In this case, the 20 MHz interleaver and the 40 MHz interleaver may correspond to the interleavers of an 802.11n system. Embodiments and parameters of such interleavers are shown in Table 1.

Table 1 below shows embodiments of interleavers included in an HE system according to an embodiment of the present invention and the parameters of the respective interleavers.

TABLE 1

| Parameters | 1 MHz | 20 MHz | 40 MHz | 80 MHz |
| --- | --- | --- | --- | --- |
| N_COL | 8 | 13 | 18 | 26 |
| N_ROW | 3 × N_BPSCS | 4 × N_BPSCS | 6 × N_BPSCS | 9 × N_BPSCS |
| N_ROT(N_SS ≤ 4) | 2 | 11 | 29 | 58 |
| N_ROT(N_SS > 4) |  | 6 | 13 | 28 |

Table 1 shows the interleaving parameters of interleavers in which data is entered in row and data is read out in column, that is, an interleaver for a 1 MHz band, an interleaver for a 20 MHz band, an interleaver for a 40 MHz band, and an interleaver for an 80 MHz band. In Table 1, N_COL indicates the number of columns of the interleaver, N_ROW indicates the number of rows of the interleaver, N_BPSCS indicates the number of coded bits per subcarrier in each special stream, N_ROT indicates a frequency rotation parameter, and N_SS indicates the number of special streams.

A method for performing interleaving on a part of a frame in which 4×FFT is used using the aforementioned interleavers is described below.

1. Interleaving Method According to the Application of 4×FFT (1) First Option:

If a 20 MHz band signal is to be transmitted, an HE STA uses the aforementioned 80 MHz interleaver. If 4×FFT is used in an HE system, an FFT size is 256. This is the same as an FFT size when an 80 MHz band signal of a VHT system is transmitted. Accordingly, in this case, an STA may perform interleaving using the 80 MHz interleaver of a VHT system in Table 1. In an embodiment, numerologies in this case may be N_SD=234, N_SP=8, N_ST=242, and N_SR=122.

If a 40 MHz band signal is to be transmitted, an HE STA may use the 160 MHz numerology of a VHT system. That is, as in the VHT system, the HE STA may segment the 40 MHz band signal into two segments using a segment parser and may use the 80 MHz interleaver in each of the two segments.

If an 80 MHz band signal is to be transmitted, an HE STA may segment the signal into two segments (i.e., two 40 MHz bandwidth frames), and each of the two segments may comply with the aforementioned processing method for a 40 MHz band signal. That is, the HE STA may segment each of the segmented 40 MHz signals into two 20 MHz signals and apply the 80 MHz interleaver of a VHT system to each of the segmented 20 MHz signals.

If a 160 MHz band signal is to be transmitted, an HE STA may segment the signal into two segments (i.e., two 80 MHz bandwidth frames), and each of the two segments may comply with the aforementioned processing method for an 80 MHz band signal.

(2) Second Option

If a 20 MHz signal is to be transmitted, an HE STA may segment the 20 MHz signal into four subblocks using a segment parser and may use the 20 MHz numerology of IEEE 802.11ac (VHT) or IEEE 802.11n (HT) or IEEE 802.11a in each of the four subblocks. In an embodiment, the HE STA may apply the 20 MHz interleaver of Table 1 to each of the four subblocks.

If a 40 MHz band signal is to be transmitted, an HE STA may segment the signal into two segments using a segment parser and may apply the aforementioned processing method for a 20 MHz signal to each of the two segments.

If an 80 MHz band signal is to be transmitted, an HE STA may segment the signal into two segments using a segment parser and may apply the aforementioned processing method for a 40 MHz signal to each of the two segments.

If a 160 MHz band signal is to be transmitted, an HE STA may segment the signal into two segments using a segment parser and may apply the aforementioned processing method for an 80 MHz signal to each of the two segments.

The first option corresponds to an embodiment in which the 80 MHz interleaver of Table 1 is chiefly used. The second option corresponds to an embodiment in which the 20 MHz interleaver of Table 1 is chiefly used.

2. If OFDMA is Taken into Consideration Along with 4×FFT

If OFDMA is used, an STA may divide a bandwidth into a plurality of subblocks and may allocate at least one subblock to at least one STA. STA data, an LTF for channel estimation, etc. may include at least one subblock.

In one embodiment, a 20 MHz band may be allocated to a maximum of 4 STAs. In such a case, the 20 MHz band may be divided into four subblocks, and at least one subblock may be allocated to an STA. An HE STA may use a numerology, that is, an interleaver, of VHT 20 MHz (N_SD=52) if the number of contiguous subblocks is 1, a numerology, that is, an interleaver, of VHT 40 MHz (N_SD=108) if the number of contiguous subblocks is 2, and a numerology, that is, an interleaver, of VHT 80 MHz (N_SD=234) if the number of contiguous subblocks is 4 depending on the number of contiguous subblocks allocated to an STA.

Subblocks may be adjusted so that they are continuously allocated as much as possible although a plurality of non-contiguous subblocks is to be allocated. In other words, an STA may allocate 2 or 4 contiguous subblocks and may perform interleaving within the allocated subblocks. An STA may have a maximum diversity gain in a frequency axis by performing segment parsing depending on the size of contiguous subblocks. The segment parsing may be performed using a method similar to a method which is used by a VHT STA in 160 MHz or 80 MHz+80 MHz transmission.

Even in 40 MHz/80 MHz/80+80 MHz/160 MHz, resources may be allocated using the aforementioned method. Furthermore, an STA can reduce the complexity or overhead of the HE-SIG by fixing the number of STAs that may be allocated to a maximum to 4 or 8. The allocated STAs may allocate contiguous resource-subblocks or allocate a set of 2 or 4 bundled subblocks using a specific pattern (using a permutation or interleaving scheme).

In the case of uplink data transmission/reception, an STA may always allocate resources to target STAs in a multiple unit (i.e., 20 MHz, 40 MHz, 80 MHz, 80+80 MHz or 160 MHz) of 20 MHz. That is, as in the aforementioned embodiment, the STA allocates 4, 8, 16, (16+16) or 32 contiguous subbands. In this case, a specific pattern in which the aforementioned set of 2 or 4 bundled subbands is mixed may not be applied. The reason for this is that unlike in DL, in the case of UL, each STA sends only a part allocated thereto and thus legacy STAs can defer transmission after CCA only when a transmission bandwidth is identical with an existing transmission bandwidth in order to guarantee coexistence with an existing system.

3. Allocation of Subblock and Corresponding Deployment of Pilot

An STA may segment a 20 MHz band into a plurality of subblocks and allocate the segmented subblocks to at least one STA. The STA may deploy a pilot signal in the segmented subblocks. In one embodiment, the STA may deploy pilots as in the common part of DL OFDMA. In another embodiment, the STA may deploy the pilots as in the aforementioned option of a VHT system depending on a bandwidth option of each subblock (or subband). In this case, the numerology (N_SD, N_SP or N_ST) of each subblock may be set identically with the bandwidth option of a VHT system. For example, an HE STA may use a 20 MHz numerology of VHT in the case of a single subblock, may use a 40 MHz numerology of VHT in the case of two subblocks, and may use an 80 MHz numerology of VHT in the case of four subblocks. Embodiments are described in more detail below with reference to drawings.

FIG. 15 shows subblock allocation methods according to the application of OFDMA according to embodiments of the present invention.

FIG. 15 shows an example of a method in which an HE STA segments a 20 MHz resource into four subblocks and allocates the segmented subblocks to at least one STA, for convenience of description.

As in FIG. 15(a), an STA may segment a 20 MHz band into four subblocks, may allocate the upper two of the four subblocks to a first STA, and may allocate the lower two of the four subblocks to a second STA. In this case, the STA may allocate subcarrier indices 6~122 to the first STA and deploy a pilot in $117^{th}$, $89^{th}$, $75^{th}$, $53^{rd}$, $39^{th}$, and $11^{th}$ subcarriers. Furthermore, no data may be transmitted in the subcarrier indices 63, 64, and 65 of the subcarrier indices 6~122 and thus the empty subcarriers may be transmitted. Subcarrier indices −6~−122 may be allocated to the second STA, and a pilot may be disposed in the subcarrier indices −117, −89, −75, −53, −39, and −11 of the subcarrier indices −6~−122. No data may be transmitted in the subcarrier indices −63, −64, and −65 of the subcarrier indices −6~−122 and thus the empty subcarriers may be transmitted.

As in FIG. 15(b), an STA may segment a 20 MHz band into four subblocks, may allocate the upper two of the four subblocks to a first STA, may allocate the lower one of the four blocks to a second STA, and may allocate the remaining lower one of the four blocks to a third STA. Subcarrier indices 6~122 may be allocated to the first STA, and a pilot may be allocated to the subcarrier indices 117, 89, 75, 53, 39, and 11 of the subcarrier indices 6~122. Furthermore, no data may be transmitted in the subcarrier indices 63, 64, and 65 of the subcarrier indices 6~122 and thus the empty subcarriers may be transmitted. Subcarrier indices −4~−60 may be allocated to the second STA of the lower first 5 MHz band, and a pilot may be deployed in the $−53^{rd}$, $−39^{th}$, $25^{th}$, and $−11^{th}$ subcarriers of the subcarrier indices −4~−60. Furthermore, no data may be transmitted in the subcarrier index −32 of the subcarrier indices −4~−60 and thus the empty subcarrier may be transmitted. Subcarrier indices −68~−124 may be allocated to the third STA of the lower second 5 MHz band, and a pilot may be deployed in the $75^{th}$, $−89^{th}$, −103th, and $−117^{th}$ subcarrier indices of the subcarrier indices −68~−124. Furthermore, no data may be transmitted in the subcarrier index −96 of the subcarrier indices −68~−124 and thus the empty subcarrier may be transmitted.

As in FIG. 15(c), an STA may segment a 20 MHz band into four subblocks, may allocate the upper one of the four subblocks to a first STA, may allocate the lower two of the four subblocks to a second STA, and may allocate the lower one of the four subblocks to a third STA. Subcarrier indices 68~124 may be allocated to the first STA of the upper 5 MHz band, and a pilot may be located in the subcarrier indices 117, 103, 89, and 75 of the subcarrier indices 68~124. Furthermore, no data may be transmitted in the subcarrier index 96 of the subcarrier indices 68~124 and thus the empty subcarrier may be transmitted. Subcarrier indices −58~58 may be allocated to the second STA of the middle 10 MHz band, and a pilot may be deployed in the subcarrier indices 53, 25, 11, −11, −25, and −53 of the subcarrier indices −58~58. No data may be transmitted in the subcarrier indices 1, 0, and −1 of the subcarrier indices −58~58 and thus the empty subcarriers may be transmitted. Subcarrier indices −68~−124 may be allocated to the third STA of the lower last 5 MHz, and a pilot may be deployed in the $75^{th}$, $−89^{th}$, $−103^{rd}$, and $−117^{th}$ subcarriers of the subcarrier indices −68~−124. Furthermore, no data may be transmitted in the subcarrier index −96 and thus the empty subcarrier may be transmitted.

As in FIG. 15(d), an STA may segment a 20 MHz band into four subblocks, may allocate the upper one of the four subblocks to a first STA, may allocate the lower one of the four subblocks to a second STA, and may allocate the lower two of the four subblocks to a third STA. Subcarrier indices 68~124 may be allocated to the first STA of the upper first 5 MHz band, and a pilot may be deployed in the $75^{th}$, $89^{th}$, $103^{rd}$, and $117^{th}$ subcarriers of the subcarrier indices 68~124. No data may be transmitted in the subcarrier index 96 of the subcarrier indices 68~124 and thus the empty subcarrier may be transmitted. Subcarrier indices 4~60 may be allocated to the second STA of the upper second 5 MHz, and a pilot may be deployed in the $53^{rd}$, $39^{th}$, $25^{th}$, and $11^{th}$ subcarriers of the subcarrier indices 4~60. Furthermore, no data may be transmitted in the subcarrier index 32 of the subcarrier indices 4~60 and thus the empty subcarrier may be transmitted. Subcarrier indices −6~−122 may be allocated to the third STA of the lower 10 MHz band, and a pilot may be deployed in the $−117^{th}$, $−89^{th}$, $−75^{th}$, $−53^{rd}$, $−39^{th}$, and $−11^{th}$ subcarriers of the subcarrier indices −6~−122. Furthermore, no data may be transmitted in the subcarrier indices −63, −64, and −65 of the subcarrier indices −6~−122 and thus the empty subcarriers may be transmitted.

As in FIG. 15(e), an STA may segment a 20 MHz band into four subblocks and may allocate the four subblocks to four STAs, respectively. Subcarrier indices 68~124 may be allocated to the STA of the upper first 5 MHz band, and a pilot may be deployed in the $75^{th}$, $89^{th}$, $103^{rd}$, and $117^{th}$ subcarriers of the subcarrier indices 68~124. Furthermore, no data may be transmitted in the subcarrier index 96 of the subcarrier indices 68~124 and thus the empty subcarrier may be transmitted. Subcarrier indices 4~60 may be allocated to the STA of the upper second 5 MHz band, and a pilot may be deployed in the $53^{rd}$, $39^{th}$, $25^{th}$, and $11^{th}$ subcarriers of the subcarrier indices 4~60. Furthermore, no data may be transmitted in the subcarrier index 32 of the subcarrier indices 4~60 and thus the empty subcarrier may be transmitted. Subcarrier indices −4~−60 may be allocated to the STA of the lower first 5 MHz band, and a pilot may be deployed in the $−53^{rd}$, $−39^{th}$, $−25^{th}$, and $−11^{th}$ subcarriers of the subcarrier indices −4~−60. Furthermore, no data may be transmitted in the subcarrier index −32 and thus the empty subcarrier may be transmitted. Subcarrier indices −68~−124 may be allocated to the STA of the lower second 5 MHz band, and a pilot may be deployed in the $−75^{th}$, $−89^{th}$, $−103^{rd}$, and $−117^{th}$ subcarriers of the subcarrier indices −68~−124. Furthermore, no data may be transmitted in the subcarrier index −96 of the subcarrier indices −68~−124 and thus the empty subcarrier may be transmitted.

4. OFDMA Resource Allocation Method

A method for allocating resources to a plurality of STAs if OFDMA is used as described above is described in more detail below.

If OFDMA is used, an STA may segment subcarriers within a unit bandwidth into a plurality of subgroups and may allocate the segmented subcarriers to a plurality of users, that is, STAs. Such a subgroup may include a subblock unit as described above. Furthermore, a method for configuring a subblock is described below. A unit for resource allocation through OFDMA in a frequency axis may be hereinafter called a subblock or resource unit.

(1) Method Using Predetermined Resource Unit Size

A system may be designed so that a subblock size corresponds to the resource unit size of an existing Wi-Fi system, such as VHT. For example, a subblock may be configured in a 26 tone, 56 tone, 114 tone, 242 tone, 484 tone or 14 (or 13) tone unit including a pilot. If a subblock is configured in such a tone unit, an added system element can be minimized because the structure of an existing Wi-Fi system, that is, an encoding/interleaving structure, can be used.

In such a case, various numbers of the remaining tones may have to be processed. Furthermore, it may be difficult to take an advantage of using 6 tones in terms of supporting various MCSs because some subblocks do not have a data tone size of a multiple of 6. For example, MCS9 cannot be used in Number Spatial Streams (NSS) 1, 2, 4, 5, 7, and 8 in the case of a 56 tone resource unit, NSS6 in the case of a 242 tone resource unit, and NSS3 in the case of a 484 tone resource unit. Furthermore, MCS6 cannot be used in NSS3 and NSS7 in the case of a 242 tone resource unit. MCS9 is crucial in supporting the maximization of throughput.

(2) Allocation Method in Unit Minimum Resource Unit

An HE STA may configure subblocks in minimum granularity including specific tones and may allocate the subblocks in a positive integer number times the subblock. Pilots may be included or may not be included in a resource unit depending on whether they are used in common or for a dedicated purpose. If such a method is used, there is an advantage in that excellent minimum granularity can be flexibly applied to most of data units. Furthermore, a resource unit can be easily allocated and scheduled with respect to various traffic amounts and various bandwidths without tones left with respect to a given bandwidth.

If the method is used, the scalability of a resource unit is very easy due to scalability, but a new resource granularity and PHY structure need to be designed. If a minimum resource unit is configured in an existing 26 tone size, there is an advantage in that most of existing PHY designs can be used.

A diversity mode and a band selection mode may be used as a method for allocating subcarriers through OFDMA. An STA may signal an allocation mode that is used using 1 bit in the HE-SIG field.

In the case of the diversity mode, subcarriers may be allocated in a distributed manner. In other words, an STA may assign a plurality of resource units as non-contiguous physical resource units. For example, an STA may allocate target STAs in different frequency channels of 20 MHz. In such a case, the STA may use an 802.11 BCC interleaver along with a proper interleaver parameter. The diversity mode has better performance in a dynamic interference environment in which an interference level is different for a different frequency channel.

In the case of the band selection mode, STAs may be allocated to a specific band having the best performance. For example, an STA may assign contiguous physical resource units to a specific STA. In this case, an additional interleaver for resource units may be unnecessary. The band selection mode has better performance in a static channel environment.

In order to reinforce performance of the interleaver, an HE STA may perform additional processing. In one embodiment, an STA may distribute encoded bits of a plurality of resource units using a segment parser and may interleave the distributed bits within a resource unit. In another embodiment, another interleaver may be designed depending on the number of resource units and used. In yet another embodiment, interleavers corresponding to a specific positive integer number times the resource units may be configured, and a resource unit exceeding the positive integer number times may be segmented and interleaved. For example, interleavers for respective resource units corresponding to a 1, 2, . . . , K multiple of a subblock may be configured, and a resource unit, that is, N times (N=M*K) of the subblock, may be segmented into M resource blocks. A K times (Kx) interleaver may be used in M K times resource units or bits distributed by a segment parser as described above may be interleaved by a K times interleaver. In this case, K may be less than, greater than, or equal to M.

A method for interleaving allocated resource is described below in addition to the method for allocating resources through OFDMA using the aforementioned predetermined resource unit size.

As described above, subcarriers may be allocated in a 13/14, 26, 56, 114, 242 or 484 tone unit. In such a case, a bandwidth may be represented as X*N (N=1, 2, 3, 4, . . . , ) (X is the number of tones of a minimum resource unit).

In one embodiment, in the case where the number of tones of a minimum resource unit is 14 (or 13), if N=1, a 14 (13) tone allocation pattern may be used, if N=2, a 26 tone allocation pattern (e.g., a pattern of 802.11ah) may be used, if N=4, a 56 tone allocation pattern (e.g., a 20 MHz numerology of 802.11ac) may be used, if N=8, a 114 tone allocation pattern (e.g., a 40 MHz numerology of 802.11ac) may be used, if N=16, a 242 tone allocation pattern (e.g., an 80 MHz numerology of 802.11ac) may be used, and if N=32, a 484 tone allocation pattern (e.g., a 160 MHz numerology of 802.11ac) may be used.

In another embodiment, in the case where a minimum resource unit is 26 tones, if N=1, a 26 tone allocation pattern (e.g., a pattern of 802.11ah) may be used, if N=2, a 56 tone allocation pattern (e.g., a 20 MHz numerology of 802.11ac) may be used, if N=8, a 114 tone allocation pattern (e.g., a 40 MHz numerology of 802.11ac) may be used, if N=16, a 242 tone allocation pattern (e.g., an 80 MHz numerology of 802.11ac) may be used, and if N=32, a 484 tone allocation pattern (e.g., a 160 MHz numerology of 802.11ac) may be used.

In the aforementioned embodiments, the pattern of 802.11ah and the numerology of each frequency band of 801.11ac may represent the interleaving parameter and pattern shown in Table 1. For example, if a resource unit is 26 tones, the 1 MHz interleaver of Table 1 may be used. If a resource unit is 56 tones, the 20 MHz interleaver of Table 1 may be used. If a resource unit is 114 tones, the 40 MHz interleaver of Table 1 may be used. If a resource unit is 242 tones, the 80 MHz interleaver of Table 1 may be used. If a resource unit is 484 tones, segment parsing may be used and two 80 MHz interleavers may be used.

A combination of the aforementioned patterns may be used other than the aforementioned N=1, 2, 4, 8, 16 or 32. For example, if N=3, the case of N=1 and the case of N=2 may be combined. If N=5, the case of N=1 and the case of N=4 may be combined or the case of N=2 and the case of N=3 may be combined. In other words, a resource unit may be segmented through segment parsing in a combination of N=1, 2, 4, 8, 16, and 32 other than N=1, 2, 4, 8, 16, and 32, and the above patterns may be applied. As in the case of N=7, N (e.g., N=7=1+2+4) that requires more than two allocations may not be used.

An STA may segment an allocated resource unit into at least two parts. Each of the parts includes the aforementioned number of tones and may include at least one pilot.

For example, resource units of 26, 56, 114 or 242 tones may be segmented into sub-resource units of 13, 28, 57, and 121 tones, respectively. For example, a resource unit may be segmented into two sub-resource units (half of N=2) if N=2. A resource unit may be segmented into three sub-resource units ((N=3)=(N=1)+2*(half of N=2)) if N=3. A resource unit may be segmented into two sub-resource units ((N=4)=2*(half of N=4)) if N=4. A resource unit may be segmented into three sub-resource units ((N=5)=(N=1)+2*(half of N=4)) if N=5.

If a resource unit is segmented into sub-resource units as described above, the BCC interleaver of 802.11 may be used. For example, a resource unit (N=8) including a total of 8 subblocks may be segmented into three sub-resource units ((N=2)+(N=4)+(N=2)). In this case, an STA may first segment the resource unit (n=8) by half (i.e., 2*(half of N=2)+2*(half of N=4)+2*(half of N=2), and may perform first permutation and second permutation on each of the segmented six sub-resource units as in Equation 1 and Equation 2 below.

$$i = N_{ROW}(k \bmod N_{COL}) + \left\lfloor \frac{k}{N_{COL}} \right\rfloor \quad \text{[Equation 1]}$$

In Equation 1, k=0, 1, . . . , N_CBSSI-1, and N indicates the number of sub-resource units.

$$j = s \left\lfloor \frac{i}{s} \right\rfloor + \left( i + N_{CBPSSI} - \left\lfloor \frac{N_{COL} \cdot i}{N_{CBPSSI}} \right\rfloor \right) \quad \text{[Equation 2]}$$

In Equation 2, s may be equal to 1 (i.e., s=1), and N_CBPSSI indicates the number of coded bits per symbol in each special stream.

In Equation 1 and Equation 2, N_COL and N_ROW are optimized parameters, and the values of Table 1 may be used as N_COL and N_ROW.

FIG. 16 shows an STA device according to an embodiment of the present invention.

In FIG. 16, the STA device may include memory 16010, a processor 16020, and an RF unit 16030. Furthermore, as described above, the STA device is an HE STA device and may be an AP or a non-AP STA.

The RF unit 16030 is connected to the processor 16020 and may send/receive a radio signal. The RF unit 16030 may up-convert data received from the processor into a transmission/reception band, and may send the signal.

The processor 16020 is connected to the RF unit 16030 and may implement a physical layer and/or MAC layer according to the IEEE 802.11 system. The processor 16030 may be configured to perform the operations described in the aforementioned drawings and description according to various embodiments of the present invention. Furthermore, a module for implementing operations of the STA device according to the various embodiments of the present invention may be stored in the memory 16010 and executed by the processor 16020.

The memory 16010 is connected to the processor 16020 and stores a variety of types of information for driving the processor 16020. The memory 16010 may be included in the processor 16020 or disposed outside the processor 16020 and may be connected to the processor 16020 by known means.

Furthermore, the STA device may include a single antenna or multiple antennas.

The contents described in the various embodiments of the present invention may be independently applied to a detailed configuration of the STA device of FIG. 16 or two or more embodiments may be applied to the detailed configuration at the same time.

FIG. 17 shows part of the STA device according to an embodiment of the present invention in more detail.

In FIG. 17, the STA device includes a forward error correction (FEC) encoder 17010, a segment parser 17020, an interleaver 17030, a mapper 17040, an IDFT unit 17050, and an analog/RF unit 17060. In FIG. 17, the FEC encoder 17010, the segment parser 17020, the interleaver 17030, the mapper 17040, and the IDFT unit 17050 may be included in the processor 16020 of FIG. 16. The analog/RF unit 17060 may correspond to the RF unit 16030 of FIG. 16. The STA device of FIG. 17 may perform the aforementioned operation of the HE STA.

The FEC encoder 17010 may encode data bits according to a predetermined coding method and output the coded data bits. In this case, the FEC encoder 17010 may be implemented as a convolutional encoder, a turbo encoder or a low density parity check (LDPC) encoder, that is, error correction code. The FEC encoder 17010 is a convolutional encoder and may perform binary convolutional code (BCC) encoding.

The segment parser 17020 may segment received data into a plurality of frequency subblocks and output the segmented subblocks. In an embodiment, the segment parser 17020 may segment input data of a 160 MHz bandwidth into two subblocks of an 80 MHz bandwidth and output the segmented data. As described above, the segment parser 17020 may also be used to segment resource units allocated to perform OFDMA in a specific interleaving unit. If data does not need to be segmented in a specific interleaving unit, the segment parser 17020 may bypass the data.

The interleaver 17030 may interleave encoded data. The interleaver 17030 operates only if the FEC encoder 17010 has performed BCC encoding and may bypass data if the FEC encoder 17010 has performed LDPC encoding. The interleaver 17030 may include a plurality of interleaving blocks. The interleaving parameters of the plurality of interleaving blocks have been illustrated in Table 1. Each of the plurality of interleaving blocks may also be called a sub-interleaver or an interleaver.

The mapper 17040 may perform constellation mapping. In other words, the mapper 17040 may modulate data bits according to a predetermined modulation scheme and output a modulated symbol (i.e., a constellation point). That is, coded data bits may be divided into bit blocks by the mapper 17040. Each bit block may be mapped to modulation symbols that represent a location according to a constellation point having amplitude and a phase. There is no limit to a modulation scheme in the mapper 17040, and m-phase shift keying (m-PSK) or m-quadrature amplitude modulation (QAM) may be used as the modulation scheme.

The IDFT unit 17050 may perform IDFT on data. In other words, the IDFT unit 17050 may perform IFFT or IDFT on modulation symbols output by the mapper 17040 and output OFDM symbols in a time domain.

More specifically, in an embodiment of the present invention, the IDFT unit 17050 may apply FFT of different sizes to the first part and second part of a transmission signal. More specifically, 4×FFT of the first part may be applied to the second part. In such a case, the symbol period of the second part may be four times the symbol period of the first part. This may also be represented as a four times (4×) IDFT/DFT period.

The analog/RF unit 17060 may up-convert a complex baseband waveform and may send an RF signal. In other words, the analog/RF unit 17060 may up-convert data/signal processed in a baseband and may send a transmission signal.

FIG. 18 is a flowchart illustrating a method for transmitting, by an STA device, data according to an embodiment of the present invention.

Steps in the flowchart of FIG. 18 are performed as in the description of the STA device of FIG. 17. An STA may FEC-encode transmission data using the FEC encoder (S18010). Furthermore, the STA may interleave the transmission data using the interleaver (S18020). Furthermore, the STA may map the transmission data to a constellation using the mapper (S18030). Furthermore, the STA may perform IDFT or IFFT processing on the transmission data using the IDFT unit (S18040). Furthermore, the STA may up-convert the transmission data using the analog/RF unit and may send the transmission signal (S18050). In FIG. 18, the description given with reference to FIG. 17 is omitted. In this case, the description of FIG. 18 may also be applied to FIG. 17.

In this specification, as described above, an STA may perform IDFT/IFFT on the first part and second part of a signal by applying different FFT sizes to the first part and the second part. The first part and second part of the signal have been described above with reference to FIG. 14. For example, the legacy preamble part (an L-STF, an L-LTF, and an L-SIG) of a signal may be included in the first part of the signal, and the data part of the signal may be included in the second part of the signal. IDFT/IFFT may be performed on the second part of the signal in an FFT size that is four times that of the first part. In this case, as described above, the symbol period is increased because spacing of a subcarrier is reduced due to an increase of the FFT size. Accordingly, the IDFT/DFT period or symbol period of the second part may be four times the IDFT/DFT period or symbol period of the first part.

Furthermore, although not shown in FIG. 18, the STA may segment the data according to an interleaver size by performing segment parsing prior to the interleaving. The segmentation and interleaving of the data according to each signal bandwidth and the allocation of subblocks through OFDMA have been described above in this specification.

In an embodiment of the present invention, the unit of data to be allocated through OFDMA is set in a plurality of resource units. For example, an STA may set a resource unit in a 26 tone, 52 tone, 114 tone, 242 tone or 484 tone unit and may allocate subcarriers to a user/STA in the unit of such a resource unit. In such a case, as described above, the interleaver of Table 1 may be used in each tone unit.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and the method have been described, and the descriptions of both the apparatus and method may be mutually supplemented and applied.

MODE FOR INVENTION

Various embodiments have been described in Best mode for invention.

INDUSTRIAL APPLICABILITY

The data transmission/reception methods in the wireless communication system according to an embodiment of the present invention have been illustrated as being applied to an IEEE 802.11 system, but may be applied to various wireless communication systems in addition to the IEEE 802.11 system.

The invention claimed is:

1. A method for transmitting data in a wireless local area network (WLAN) system, the method performed by a first station (STA) device and comprising:
   generating a transmission signal comprising a first part and a second part; and
   transmitting the generated transmission signal via a resource unit to at least a second STA;
   wherein Inverse Discrete Fourier Transform (IDFT) is performed on the first part and the second part using different Fast Fourier Transform (FFT) sizes,
   wherein the second part is allocated to the at least the second STA in units of at least one resource unit,
   wherein the at least one resource unit is K times a minimum resource unit,
   wherein K is an integer,
   wherein the first part includes a high-efficiency-SIGNAL (HE-SIG) field comprising an indicator for a resource allocation mode,
   wherein the resource allocation mode is a diversity mode or a resource allocation band-selection mode,
   wherein one or more non-contiguous resource units in different 20 MHz subchannels of an entire bandwidth of the generated transmission signal are allocated to the at least the second STA when the diversity mode is configured,
   wherein each portion of the one or more non-contiguous resource units includes at least one pilot tone,
   wherein one or more contiguous resource units are allocated to the at least the second STA when the band-selection mode is configured,
   wherein the at least one resource unit is interleaved using an interleaving scheme corresponding to N times the minimum resource unit,
   wherein N is an integer less than or equal to P, and
   wherein, when K is equal to P times N, the at least one resource unit is divided into P resource blocks, and each of the P resource blocks is interleaved using the interleaving scheme corresponding to N times the minimum resource unit.

2. The method of claim 1, wherein:
   the first part further includes a legacy-short training field (L-STF), a legacy-long training field (L-LTF), and a legacy-signaling (L-SIG) field; and
   the second part includes a data part.

3. The method of claim 2, wherein an IDFT/DFT period of the second part is four times an IDFT/DFT period of the first part.

4. The method of claim 1, wherein:
   the at least one resource unit comprises a first resource unit of 26 tones; and
   the first resource unit is interleaved using the corresponding interleaving scheme for a 1 MHz band.

5. The method of claim 1, wherein:
   the at least one resource unit comprises a first resource unit of 52 tones; and
   the first resource unit is interleaved using the corresponding interleaving scheme for a 20 MHz band.

6. The method of claim 1, wherein:
   the at least one resource unit comprises a first resource unit of 114 tones; and
   the first resource unit is interleaved using the corresponding interleaving scheme for a 40 MHz band.

7. The method of claim 1, wherein:
the at least one resource unit comprises a first resource unit of 242 tones; and
the first resource unit is interleaved using the corresponding interleaving scheme for an 80 MHz band.

8. The method of claim 1, wherein:
the at least one resource unit further comprises a first resource unit of 484 tones; and
the first resource unit is interleaved using the corresponding interleaving scheme for an 80 MHz band.

9. The method of claim 2, wherein a symbol interval of the second part per symbol is four times a symbol interval of the first part per symbol.

10. A station (STA) device transmitting data in a wireless local area network (WLAN) system, the STA device comprising:
a transceiver configured to send and receive a radio signal; and
a processor configured to:
generate a transmission signal comprising a first part and a second part; and
control the transceiver to transmit the generated transmission signal via a resource unit to at least a second STA,
wherein Inverse Discrete Fourier Transform (IDFT) is performed on the first part and the second part using different Fast Fourier Transfer (FFT) sizes,
wherein the second part is allocated to the at least the second STA in units of at least one resource unit,
wherein the at least one resource unit is K times a minimum resource unit,
wherein K is an integer,
wherein the first part includes a high-efficiency-SIGNAL (HE-SIG) field comprising information for a resource allocation diversity mode or a resource allocation band-selection mode,
wherein one or more non-contiguous resource units in different 20 MHz subchannels of an entire bandwidth of the generated transmission signal are allocated to the at least the second STA when the diversity mode is configured,
wherein each portion of the one or more non-contiguous resource units includes at least one pilot tone, and
wherein one or more contiguous resource units are allocated to the at least the second STA when the band-selection mode is configured,
wherein the at least one resource unit is interleaved using an interleaving scheme corresponding to N times the minimum resource unit,
wherein N is an integer less than or equal to P, and
wherein, when K is equal to P times N, the at least one resource is divided into P resource blocks, and each of the P resource blocks is interleaved using the interleaving scheme corresponding to N times the minimum resource unit.

11. The STA device of claim 10, wherein:
the first part further includes a legacy-short training field (L-STF), a legacy-long training field (L-LTF), and a legacy-signaling (L-SIG) field; and
the second part includes a data part.

12. The STA device of claim 10, wherein an IDFT/DFT period of the second part is four times an IDFT/DFT period of the first part.

13. The STA device of claim 10, wherein:
the at least one resource unit comprises a first resource unit of 26 tones; and
the first resource unit is interleaved using the corresponding interleaving scheme for a 1 MHz band.

14. The STA device of claim 10, wherein:
the at least one resource unit comprises a first resource unit of 52 tones; and
the first resource unit is interleaved using the corresponding interleaving scheme for a 20 MHz band.

15. The method of claim 1, wherein:
encoded bits of data for transmission in the generated transmission signal are interleaved using an interleaver for the at least one resource unit when the at least one resource unit is allocated;
the encoded bits of data are distributed to M resource units using a segment parser when the M resource units are allocated;
the distributed encoded bits of data are interleaved within each of the M resource units using the interleaver, and
M is a positive integer greater than or equal to 2.

16. The STA device of claim 10, wherein:
encoded bits of data for transmission in the generated transmission signal are interleaved using an interleaver for the at least one resource unit when the at least one resource unit is allocated;
the encoded bits of data are distributed to M resource units using segment parser when the M resource units are allocated;
the distributed encoded bits of data are interleaved within each of the M resource units using the interleaver, and
M is a positive integer greater than or equal to 2.

17. The STA device of claim 11, wherein a symbol interval of the second part per symbol is four times a symbol interval of the first part per symbol.

* * * * *